June 7, 1960

A. G. MUELLER 2,940,030

MOTOR REGULATOR SYSTEM

Filed Nov. 9, 1955

INVENTOR.
ARMAND G. MUELLER
BY

United States Patent Office 2,940,030
Patented June 7, 1960

2,940,030

MOTOR REGULATOR SYSTEM

Armand G. Mueller, Wauwatosa, Wis., assignor to Square D Company, Detroit, Mich., a corporation of Michigan Filed Nov. 9, 1955, Ser. No. 545,922

5 Claims. (Cl. 318—327)

The present invention relates to a motor regulator system and more particularly, to a motor regulator system having an armature voltage limiting circuit.

An object of the present invention is the provision of a circuit for limiting the voltage across the armature of a motor in a motor regulator system.

Another object is to provide a circuit for limiting the armature voltage in a motor regulator system to a predetermined level.

A further object of the invention is the provision of an armature voltage limiting circuit to prevent motor runaway resulting from failure of the motor regulator system.

Still another object is to provide a circuit for limiting the armature voltage and limit the motor speed to a level slightly above base speed in the event of circuit failure.

A still further object of the invention is the provision of a motor control circuit in which the armature voltage and motor speed are limited to a level slightly higher than the base speed rating in the event of a feedback signal failure.

Another object is to provide a circuit in a feedback motor control system for automatically changing over from one feedback circuit to another feedback circuit at a predetermined motor voltage.

Further objects and features of the invention will be readily apparent to those skilled in the art from the specification and appended drawings illustrating certain preferred embodiments in which.

Figure 1:
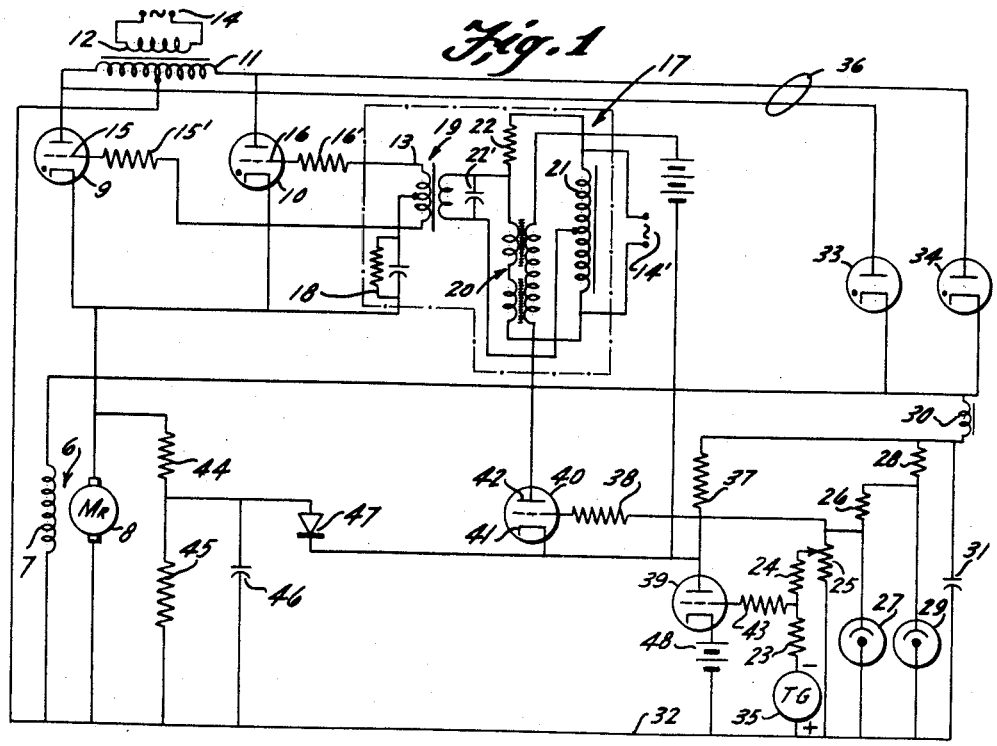
Figure 1 is a circuit diagram of a motor regulator system illustrating a preferred embodiment of the invention.

Referring to the drawings wherein like reference characters designate like or corresponding parts throughout the several views, there is shown in Figure 1, a motor regulator system for supplying controlled D.C. power to a D.C. shunt motor 6 from an A.C. supply 14. Two full wave center tap rectifier circuits are coupled to the primary 12 of the supply transformer by a secondary 11, supplying anode voltage to the thyratrons 9 and 10 in the armature circuit; and rectifiers 33 and 34 through lines 36 for supplying the motor shunt field 7 and providing a regulated voltage to the speed control rheostat 25.

The cathodes of the thyratrons 9 and 10 may be connected directly to the motor armature 8 and to a grid bias network 18, including a resistor and capacitance in parallel which is connected to an intermediate tap along the secondary of the grid transformer 19. The thyratron grids 15 and 16 are controlled by a phase shifting network 17 and are connected to the opposite ends of the grid transformer secondary 13. The primary of the transformer 19 forms a leg of a bridge and the upper end of which is connected at the junction of resistor 22 and power windings of the saturable reactor 20.

The resistor 22 and power windings of the saturable reactor 20 are connected in series across the transformer 21 having an intermediate tap connected to the other end of the primary of the grid transformer 19. The control winding of the saturable reactor 20 is connected in the plate circuit of the D.C. amplifier tube 40 for progressively shifting the grid voltage $V_g$ from 180° lag to 0° relative to the anode voltage $V_p$. Capacitor 22′ may be added for increasing initial phase shift lag; this prevents tube firing due to spurious signal voltages resulting from pickup.

The output of the full wave rectifier circuit, including rectifiers 33 and 34 in addition to supplying voltage to the shunt field 7 of the motor 6, provides a regulated voltage across the resistor element 25 of the speed potentiometer and anode supply voltage for the D.C. amplifier tube 39. The speed potentiometer is connected across the voltage regulator tube 27 and to full wave rectifiers 33 and 34 through resistors 26 and 28 and coil 30. A capacitor 31 connected between the coil 30 and ground, combines with the coil for filtering the voltages supplied to the speed potentiometer 25 and D.C. amplifier 39. A portion of the regulated voltage across the voltage regulator tube 27 supplies an adjustable reference voltage which is taken off the resistor 25 and applied to a comparison circuit including resistors 24 and 23 to control the speed of the motor 6. The voltage regulator tube 29 regulates the B+ supply to the plate of tube 39 through the load resistor 37.

Tachometer generator 35 is mechanically coupled to the motor 6, producing a feedback voltage indicative of motor speed, which is applied to the resistor 23, opposing the speed reference voltage taken off the resistor element of the speed potentiometer 25. The resultant current produces a voltage or error signal at the junction of resistors 23 and 24 of the voltage divider, which is applied to the grid of the tube 39 across the current limiting resistor 43. The cathode of the tube 39 is connected to the ground return 32 through a cathode bias source 48 and the plate is connected to B+ through plate load resistor 37. The amplified error signal voltage output of the tube 39 may be coupled directly to the cathode 41 of the tube 40 for controlling the signal current in the plate circuit including the saturable reactor 20. The grid of the tube 40 may be connected directly to the grid biasing source at the junction of potentiometer 25 and resistor 26 through the grid current limiting resistor 38, for controlling the static or quiescent operating point of the tube 40, assuming the plate voltage is predetermined.

Resistors 44 and 45 may be connected across the armature 8 of the motor 6 to provide an armature voltage feedback signal level or armature voltage limiting signal at their junction. Under normal operating conditions, the rectifier 47 blocks current flow from the cathode 41 of the tube 40. However, should the armature voltage increase beyond a predetermined limit, the voltage applied to the plate of the rectifier will exceed the decreasing voltage level at the cathode of the tube 40; whereupon rectifier 47 will conduct, limiting the conduction of tube 40, preventing further saturation of the reactor 20, and voltage output of thyratrons 9 and 10. Capacitor 46 may be connected across the resistor 45 to limit the armature voltage spikes produced by the rectified voltage applied to the motor 6 and prevent spurious conduction of rectifier 47.

In operation, the voltage, and therefore the speed of motor 6, is controlled by the voltage output of thyratrons or grid controlled gas tubes 9 and 10. Gradual or progessive control of the voltage output of the thyratrons is provided by the grid phase shift circuit 17, which decreases the angle of the lag $\theta$ from 180° to 0°.

An error signal resulting from a speed increase control movement of the potentiometer 25, an adjusted increase in reference voltage drives the grid of tube 39 positive, increasing the plate current and potential drop across the plate resistor 37. Since the cathode 41 of tube 40 is connected to the plate of tube 39, its potential falls off, increasing the current through tube 40 and the control winding current of saturable reactor 20. The increased current through the control winding decreases the inductance of the load windings of the saturable reactor 20 and decreases the angle of lag of the applied grid voltage $V_g$ relative to the anode voltage $V_p$, increasing the voltage supplied to the armature 8 of the motor 6.

In a similar manner, a feedback signal failure may drive the grid of the tube 39 positive, increasing the plate current of amplifier 39 and lowering the voltage at the cathode 41 of amplifier 40, thereby increasing the current through tube 40 and the saturable reactor 20, causing the armature voltage to increase rapidly out of control. However, upon the armature voltage reaching a predetermined limit across the voltage divider 44, 45, the rectifier 47 will conduct, holding the cathode 41 of the tube 40 to a minimum fixed negative voltage level.

Summarizing the operation, the voltage divider 44, 45 is adjusted to provide a voltage crossover point in the regulating circuit, slightly above motor base speed, where the control is transferred from tachometer feedback to armature voltage feedback. Although, the circuit is intended to protect the motor from control circuit failure and run-away motor speeds resulting therefrom, the scope of operation should not be restricted thereby but considered broadly as a means for automatically switching over from one feedback control signal to another at a predetermined operating point.

Figure 2:
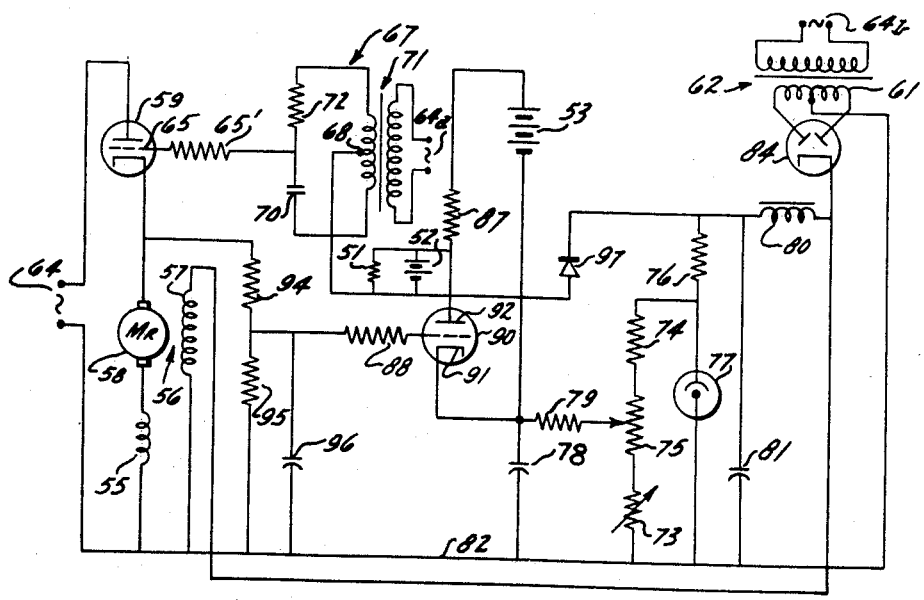
Figure 2 is a circuit diagram of a motor regulator system showing another embodiment of the invention.

Figure 2 illustrates an armature voltage limiting circuit in a motor regulator system, having an armature power rectifier circuit, supplied from an A.C. source 64, which is connected across motor armature 58 in series with motor series field 55. The thyratron or grid controlled gas tube 59 varies the voltage across the armature and series field by progressively changing the point of intersection of the applied grid voltage $V_g$ and the critical grid voltage of the thyratron. The control signal on the grid 65 is supplied by a phase shifting circuit 67 and an armature feedback voltage through a current limiting resistor 65' wherein an A.C. ripple voltage is superimposed on the direct current control voltage output of the amplifier tube 90. The A.C. source 64 and 64a would normally be the same, whereby the phase of the grid voltage is shifted to lag the anode voltage by 90° in the network 67, which may include a transformer 71 having a secondary with an intermediate tap 68 for connection to the control signal source and a phase shifting circuit including resistor 72 and capacitor 70, which are connected in series across the ends of the secondary.

A voltage divider including resistors 94 and 95 may be connected across the motor and series field to provide a source of armature feedback voltage. The capacitor 96 is connected between the junction of resistors 94 and 95 and ground return to smooth out voltage spikes generated by the armature in response to the rectified supply, providing a filtered armature voltage feedback signal to the grid of the amplifier tube 90.

A motor shunt field D.C. supply is provided by the full wave rectifier circuit including rectifier tube 84 having a pair of anodes connected across the secondary 61 of the transformer 62; the source 64b connected across the primary 62 may be the same as sources 64 and 64a, although in this instance, it need not be in phase with said other sources. The midtap of the secondary 61 is connected to ground, and the cathode of the tube 84 is connected directly to the shunt field 57 and a filter circuit including coil 80 and capacitor 81, supplying a filtered D.C. voltage to the regulator tube 77. Regulator tube 77 in series with resistor 76 provides a regulated voltage across resistor 74, speed potentiometer 75 and minimum speed regulating variable resistor 73. The speed control potentiometer 75 and resistors 73 and 74 form an adjustable voltage divider across the regulated voltage. The potentiometer tap is connected to the cathode 91 of the amplifier tube 90 through a current limiting resistor 79 which is connected to a capacitor 78 forming an R.C. network for delay of voltage transients produced by variations of the speed potentiometer setting.

The armature voltage feedback signal may be derived from the junction of the voltage divider resistors 94, 95 and connected to the grid of the amplifier 90 through the grid current limiting resistor 88. The plate circuit of the amplifier 90 includes a load resistor 87 and plate supply 53, and has an output which is connected to the phase shift circuit at the intermediate tap 68 through a compensating network, including resistor 51 and direct current bias source 52, which lowers the D.C. operating level of the output control signal to that of the cathode of thyratron 59. The rectifier 97 may be connected to the lower side of the compensating network and to the filtered field supply at the junction of coil 80 and resistor 76 to provide a D.C. biasing limit or armature limiting signal voltage for the grid of the thyratron or grid control rectifier tube 59 thereby limiting the armature voltage to a level slightly above base speed.

Under normal operating conditions the limiting circuit, including the rectifier 97, has no effect on the operation of the motor regulator system since the plate potential of tube 90 is less than the maximum voltage at the junction of coil 80 and resistor 76. However, the rectifier 97 conducts and limits the D.C. voltage level of the grid 65 of the thyratron in an A.C. plus D.C. control upon failure of the tube 90 or for any other reason the voltage across the armature rises to a level slightly higher than base speed or any other predetermined level.

In operation, the speed of the motor is adjusted by varying the tap on the potentiometer 75, lowering or raising the potential of the cathode 91 which is compared to the armature voltage feedback signal on the grid of tube 90 wherein the difference is amplified, producing an error signal in the output circuit which controls the D.C. voltage signal level on the grid 65 of the thyratron 59 and the output to the armature 58 of the motor 56.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

I claim:

1. A motor regulator system comprising; a motor including a motor armature, a source of power, circuit means coupling said source to the motor armature for varying the voltage applied to said armature including an amplifier, a source of feedback signal voltage proportional to motor speed, a reference voltage source and comparison circuit means for placing a variable portion of said reference voltage in opposition to said feedback voltage and applying the resultant voltage output to said amplifier to produce a control signal varying said armature voltage and an armature voltage limiting circuit coupling a limiting voltage, proportional to the armature voltage, to the amplifier output, upon the armature voltage exceeding the amplitude of the output control signal voltage.

2. A motor control circuit comprising; a D.C. motor including an armature and shunt field, a variable reference voltage source for varying the speed of said motor, a D.C. motor including an armature and shunt field, means for producing a feedback signal voltage proportional to motor speed including a tachometer generator mechanically coupled to said motor armature and a voltage divider across said armature, an error measuring circuit connecting said variable reference source and tachometer output in voltage opposition to produce an error signal voltage which is proportional to the algebraic difference, an amplifier having an input connected to said error measuring circuit for amplying said error signal to produce an output control signal, a power source, control circuit means coupling said power source to said armature responsive to said control signal to vary the voltage across said armature, and circuit means including unidirectional device blocking current flow to said divider connecting the output of said amplifier to said voltage divider whereby the control signal voltage is limited in amplitude to voltage level of said armature feedback voltage.

3. A motor control circuit comprising; a D.C. motor including an armature and shunt field, a variable reference voltage source for varying the speed of said motor, a D.C. motor including an armature and shunt field, means for producing a feedback signal voltage proportional to motor speed including a tachometer generator mechanically coupled to said motor armature and a voltage divider across said armature, an error measuring circuit connecting said variable reference source and tachometer output in voltage opposition to produce an error signal voltage which is proportional to the algebraic difference, an amplifier having an input connected to said error measuring circuit for amplifying said error signal to produce an output control signal, a power source, control circuit means coupling said power source to said armature including a phase shift circuit and a thyratron having a plate connected to said source and a grid coupled to said source through said phase shift circuit wherein said phase shift circuit is responsive to said control signal to control the phase of the thyratron firing to vary voltage across said armature, and circuit means including unidirectional device blocking current flow to said divider connecting the output of amplifier to said voltage divider whereby the control signal voltage is limited in amplitude to voltage level of said armature feedback voltage.

4. The motor control system of claim 1 in which the feedback signal source comprises a tachometer.

5. The motor control system of claim 1 in which the armature voltage limiting circuit comprises a voltage supply which is proportional to the supply voltage applied to the armature and is coupled to the comparison circuit means by a unidirectional conducting device.

References Cited in the file of this patent

UNITED STATES PATENTS

| | | |
|---|---|---|
| 2,734,160 | Franks et al. | Feb. 7, 1956 |
| 2,754,463 | Hansen et al. | July 10, 1956 |
| 2,778,982 | Loeffler | Jan. 22, 1957 |

FOREIGN PATENTS

| | | |
|---|---|---|
| 693,840 | Great Britain | July 8, 1953 |